United States Patent
Kau et al.

(10) Patent No.: US 9,253,125 B2
(45) Date of Patent: Feb. 2, 2016

(54) MANAGING A MESSAGING STATE ACROSS MULTIPLE CLIENTS

(71) Applicant: International Business Machines Corporation, Armonk, NY (US)

(72) Inventors: Christian B. Kau, Los Altos, CA (US); Jeffrey S. Pierce, Sunnyvale, CA (US); Christine M. Robson, San Jose, CA (US); Jerald T. Schoudt, Douglassville, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 13/911,226

(22) Filed: Jun. 6, 2013

(65) Prior Publication Data
US 2014/0365583 A1 Dec. 11, 2014

(51) Int. Cl.
*G06F 15/16* (2006.01)
*H04L 12/58* (2006.01)

(52) U.S. Cl.
CPC ...................................... *H04L 51/04* (2013.01)

(58) Field of Classification Search
CPC ....................................................... H04L 51/04
USPC .......................... 709/204, 206, 207, 217, 219
See application file for complete search history.

(56) References Cited

U.S. PATENT DOCUMENTS

| | | | |
|---|---|---|---|
| 6,618,710 B1 * | 9/2003 | Zondervan et al. | 706/11 |
| 7,031,698 B1 * | 4/2006 | Appelman | 455/417 |
| 7,702,739 B1 | 4/2010 | Cheng et al. | |
| 7,792,913 B2 | 9/2010 | Chen | |
| 8,078,719 B2 * | 12/2011 | Etelapera | 709/224 |
| 8,868,661 B2 * | 10/2014 | Asawa et al. | 709/206 |
| 2002/0165000 A1 | 11/2002 | Fok | |
| 2003/0018726 A1 | 1/2003 | Low et al. | |
| 2005/0149620 A1 | 7/2005 | Kirkland et al. | |
| 2007/0133594 A1 * | 6/2007 | Pazhyannur et al. | 370/465 |
| 2007/0223428 A1 * | 9/2007 | Patterson et al. | 370/338 |
| 2009/0128861 A1 * | 5/2009 | Toscano et al. | 358/400 |
| 2009/0138606 A1 | 5/2009 | Moran et al. | |
| 2009/0325609 A1 * | 12/2009 | Rosen et al. | 455/466 |
| 2010/0011063 A1 | 1/2010 | Blaiotta et al. | |
| 2012/0042015 A1 * | 2/2012 | Crawford et al. | 709/206 |

OTHER PUBLICATIONS

Anonymous; "A method to allow messaging clients to self execute the message processing logic specified in a message, without having any additional logic implemented in the client application"; http://priorartdatabase.com/IPCOM/000194700; Apr. 8, 2010.
IBM; "Method and System for Changing IM State via SMS"; http://www.ip.com/pubview/IPCOM000140500D; Sep. 11, 2006.
IBM; "Seamless integration of different end devices for Instant Messaging"; http://www.ip.com/pubview/IPCOM000179357D; Feb. 13, 2009.
Disclosed Anonymously, "Method and System for Switching Communication Channels for Maintaining Continuity in Instant Messaging (IM) Sessions", IP.com No. 000213894, Publication Date: Jan. 4, 2012, pp. 1-2.

* cited by examiner

*Primary Examiner* — Viet Vu
(74) *Attorney, Agent, or Firm* — Daniel E. Johnson; Michael A. Petrocelli

(57) ABSTRACT

Embodiments of the invention relate to managing a messaging state across multiple clients and devices which use respective communications systems. In one embodiment, a plurality of users are connected to multiple messaging communications systems. The multiple messaging communications systems use a plurality of associated messaging clients on each of the users' respective devices, for messaging communications between the users. The users' messaging communications are stored from the multiple messaging communications systems and their respective messaging clients, using a proxy service. A device, of the plurality of messaging clients, being used by a messaging user of the plurality of users is tracked. A current messaging communication of the messaging user from the stored messaging communications is routed to the currently used device, using the proxy service, for maintaining a state of the messaging communications of the users.

20 Claims, 2 Drawing Sheets

100

104 Connecting a plurality of users to multiple messaging communications systems using a plurality of associated messaging clients on respective devices for messaging conversations between the users, using a proxy service.

106 Managing the messaging communications between users including having the proxy service schematically between the user/device and the messaging service. The client device having client software for interaction with the proxy service and maintaining a current communications thread between the users.

108 Maintaining the messaging conversations of the users by storing the user's messaging conversations, using a proxy service, which may include databases.

116 Routing a current messaging conversation of the messaging user from the stored conversations to the currently used device via a respective messaging communications system.

112 Determining and Tracking a currently used device used by a messaging user.

FIG. 2

MANAGING A MESSAGING STATE ACROSS MULTIPLE CLIENTS

BACKGROUND

Embodiments of the invention relate to managing electronic messaging across multiple clients. Communicative exchanges by multiple users using a communications network can be extensive. Users may communicate via electronic messaging which may be accessible by a computer or personal data assistant (PDA), and further may include, on-line chat groups, blogs, e-mails, instant messaging between users, document libraries, and social networking websites accessible using the Internet. Messaging Applications such as Instant Messaging and group messaging are becoming prolific on computing devices. Simultaneously, the use of multiple clients, for example, mobile phones, tablets, laptops, netbooks, car communication systems, etc., is also growing.

BRIEF SUMMARY

An aspect of the invention includes maintaining a messaging state across multiple clients and devices which use respective communications systems. A plurality of users are connected to multiple messaging communications systems. The multiple messaging communications systems use a plurality of associated messaging clients on each of the users' respective devices, for messaging communications between the users. The users' messaging communications are stored from the multiple messaging communications systems and their respective messaging clients, using a proxy service. A device, of the plurality of messaging clients, being used by a messaging user of the plurality of users is tracked. A current messaging communication of the messaging user from the stored messaging communications is routed to the currently used device, using the proxy service, for maintaining a state of the messaging communications of the users.

Another aspect of the invention includes managing a messaging state across multiple clients and devices which use respective communications systems. multiple messaging communications systems use a plurality of associated messaging clients on respective devices for messaging communications between a plurality of users. A proxy service includes a program which is executable by a processor of a computer. The proxy service is configured to: store the users' messaging communications from the multiple messaging communications systems and their respective messaging clients. Track a currently used device of the plurality of messaging clients used by a messaging user of the plurality of users. Route a current messaging communication of the messaging user from the stored messaging communications to the currently used device via a respective messaging communications system to the currently used device, using the proxy service, for maintaining a state of the messaging communications of the users.

Another aspect of the present invention includes a computer program product for maintaining a messaging state across multiple clients and devices which use respective communications systems. The computer program product includes a computer readable storage medium having program code embodied therewith, and the program code is readable/executable by a processor to perform: connecting a plurality of users to multiple messaging communications systems using a plurality of associated messaging clients on respective devices for messaging communications between the users, using a proxy service. Storing the users' messaging communications from the multiple messaging communications systems and their respective messaging clients, using the proxy service. Tracking a currently used device of the plurality of messaging clients used by a messaging user of the plurality of users. Routing a current messaging communication of the messaging user from the stored messaging communications to the currently used device via a respective messaging communications system, using the proxy service, for maintaining a state of the messaging communications of the users.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is a flow chart illustrating a method for managing a messaging state across multiple clients using respective communications systems according to an embodiment of the disclosure using the system shown in FIG. 1.

DETAILED DESCRIPTION

Figure 1:
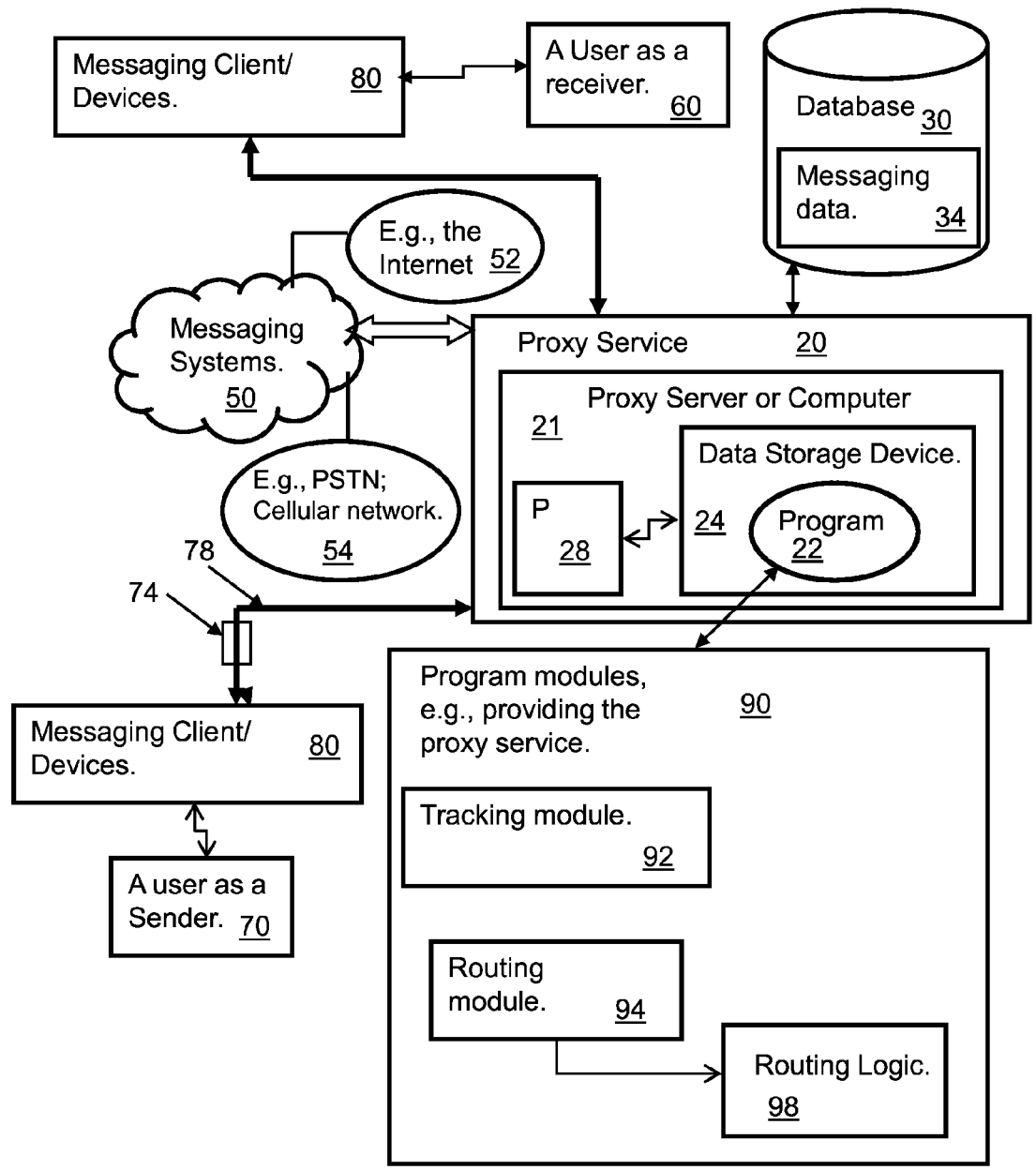
FIG. 1 is a schematic block diagram illustrating an overview of the system and methodology for managing a messaging state across multiple clients using respective communications systems according to an embodiment of the disclosure.

Referring to FIGS. 1 and 2, a system 10 and method 100 according to an embodiment of the invention connects a plurality of users, represented by a receiving user 60, and a sending user 70, to multiple messaging communications systems 50. The messaging communications systems 50 use a plurality of associated messaging clients on respective messaging devices for messaging communications (also can be referred to as messaging conversations, or electronic communications) between the users, as in step 104 of FIG. 2. The messaging communications are generally electronic messaging, which include data, text, or electronic content, and may require an associated communications system. The messaging clients may be embodied as messaging services enabling communication devices (or simply referred to as devices herein), including: a laptop, a notebook, a cell phone, a netbook, a tablet, a personal data assistant (PDA), or a car communication system, to message other devices. The devices and their respective messaging clients are collectively represented as messaging clients/devices 80. Exemplary messaging clients/messaging services may include Short Message Service (SMS) which is a text messaging service component of phone, web, or mobile communication systems, using standardized communications protocols which allows the exchange of short text messages between fixed line or mobile phone devices. The messaging communications systems 50 may include the Internet 52, or a public switched telephone network (PSTN) 54, which further may include telephone lines, fiber optic cables, microwave transmission links, cellular networks, communications satellites, and undersea telephone cables. The Internet may facilitate numerous texting techniques. For example, using a cell phone or laptop computer to send text messages via Multimedia Messaging Service (MMS) (related to SMS) as a way to send messages that include multimedia content to and from mobile phones, or to and from one or more email accounts via the Internet.

The communications connections between users are maintained using a proxy service 20, as in step 104 of FIG. 2. The proxy service may include one or more proxy servers or computers 21. The computer 21 of the proxy service 20 includes a program 22 which is executable by a processor 28 of the computer 21, as shown in FIG. 1. The program may be embodied on a computer readable storage medium, for example, a data storage device 24. A program may be installed on a user's device to interact with the proxy service, for example, communicate or enhance communications with the proxy service.

A user may be either a sender or a receiver, at any time in the communications thread. Referring to step 106 of FIG. 2, the proxy service 20 detects the currently used device by communicating with the client device 80, which may include client software for communication with the proxy service. The proxy service is schematically between the device 80 and the messaging system 50, as shown in FIG. 1. For example, the proxy service 20 forwards a message from a sender to the appropriate messaging system 50. The proxy service is between the messaging system and the client with respect to the flow of the message, and receives the message on its way to the receiver. The proxy service detects a current device for the receiver and forwards the message to the receiver's device. That is, when the receiver switches devices, the proxy service detects the switch to a new current device, and routes the message (and/or past or current messaging threads) to the appropriate messaging system for delivery, and notifies the sender of the device switch. Thus the proxy service manages the messaging communications when a first user switches between a first client of a plurality of clients to a second client, for example, switching between two devices such as a cell phone and a laptop. In another example, a first user may be communicating with a second user (or more users), and the first user switches to another device. The second user is notified of a new currently active device for the first user when the first user switches between devices.

The system 10 and method 100 maintain the state of the messaging communications of the users from the multiple messaging communications systems and their associated messaging clients and respective devices, using the proxy service, as in step 108 shown in FIG. 2. Step 108 includes storing the users' messaging communications from the multiple messaging communications systems and their respective messaging clients, using the proxy service 20. A message is generically represented by a text message 74 traveling via a data path 78, from a sender 70 using a communications device 80, to a receiver 60. The messaging communications (e.g., conversations/text/data) are generically represented by messaging data 34 stored in a database 30 which is accessible by the computer 21 and the program 22.

The system 10 and the method 100 determine and track a currently used device, which is one of the plurality of devices used by a messaging user of the plurality of users, as in step 112 of FIG. 2. The currently used device is generically represented by the devices 80 as discussed above. The currently used device is the device used at the present time by the user.

The system 10 and the method 100 routes a current message from a messaging user, which may be the sender 70, or the receiver 60 replying to the sender, from the stored messaging data 34 to the currently used device by coordinating the respective messaging communications system 50 with the messaging client of the currently used device, using the proxy service, as in step 116. For example, a sender 70 may send one or more text messages 74 to a receiver 60. When the user switches to a new current device 80, the system 10 and method 100 routes the saved messaging communication, generically represented by the messaging data 34, to the new current device for the receiver to access. Thereby, the receiver seamlessly continues the messaging communication, as does the sender, and thus, the system and method of the present disclosure maintains the messaging state between the users.

The method steps and system features may be embodied in modules of the program for performing the tasks of each of the steps of the method and system, which are generically represented in FIG. 1 as program modules 90. For example, a tracking module 92 tracks the currently used device used by a messaging user, and a routing module 94 routes a current messaging communication of the messaging user, to the current device of the user. The routing module 94 may include routing logic 98. Without the disclosed proxy service, a current messaging communication would be lost when a user switches devices. However, the system and method of the present disclosure uses the proxy service to capture the messaging communication history to forward to a respective user, such that a seamless communication/conversation results. Thereby, the system and method of the present disclosure manages and maintains the messaging state between the users.

The present disclosure includes storing multiple users' messaging communications across multiple messaging systems, so that the messaging communication can be provided to a user seamlessly, that is, without interruption whether the sender or the receiver moves between devices and messaging systems. The messaging communications may also be saved and provided for data mining for other services. The users may message each other, for example, using instant messaging and SMS applications on respective communications networks, for example, the Internet and a telephone network.

In operation, for example, when a user creates a new message, the proxy service 20 forwards the message to the messaging system 50 (e.g., an instant messaging (IM) server). The proxy service 20 maintains the state of messaging communications by storing the messages sent/received 34 from the devices 80 that partake in messaging, e.g., (IM) chat. The proxy service may store the messaging in a relational database allowing for future retrieval of the messages. One technique for identifying the saved messages for forwarding by the proxy service, is to assign each message a unique ID (identification), generate a timestamp when the message was created, and generate an identifier for the device used to create the message. When switching to a new device, as in step 116 of the method 100, and continuing a messaging conversation, a new device requests all messages for the user. The proxy service responds by returning all messages sorted by their creation date to the new device. Thereby, the user sees all messages on the new device, and is able to continue the messaging conversation without losing context.

The general operation of the present disclosure and example benefits are discussed below. In operation, the clients (respective to each of the devices) are connected to a messaging system via the proxy service. This proxy service cooperates with the client software to determine which clients are active (including which client is primary) for the purposes of client capabilities. The proxy service maintains a persistent session (e.g., text messaging session, messaging thread, or the like) open for the user, and thus, the user and their messaging partners do not experience any interruption in the communication/conversation when transitioning from one device to another. Maintaining the communication/conversation history in the proxy service allows new clients/devices that the user activates to "catch up" and display the entire communication for the user to maintain the context of the communication. If the user temporarily looses connectivity, either intentionally or accidentally, the proxy service will distinguish between this state and an explicit action to disconnect/logout from the user. For example, a temporary lose of connectivity between a user's device and its communications system is recognized as one state by the proxy service and a disconnect/logout is recognized as another state of the messaging communications by the proxy service. Alternatively, connectivity for messaging can be maintained by routing messages via email or SMS.

Additionally, the proxy service may store messages for a defined period of time, which may be set by the user and/or an administrator, enabling clients/devices that are activated after the messages are sent to receive the saved prior messages/communications. Also, when a user reads or responds via one device, the proxy service can mark all previous messages in the communication as read and reflect this on the other devices.

Additionally, when a user transitions from one device to another, the proxy service can change the user's availability state, and related attributes, to reflect the capabilities of the current device. When a user is disconnected completely from the proxy service, the proxy service may send messages via SMS/MMS or email, as configured by the user and/or an administrator. The proxy service can be implemented to use the same messaging protocol as a current or main messaging service, or it could use a completely separate protocol or both. Thus, a user maintains a messaging state by the proxy service transferring communication data, for example, an IM (instant messaging) session to another conduit, and the users transfer to another device may be indicated, and it may be indicated that the user is available, albeit on a different channel/medium.

Thereby, using the system and method of the present disclosure, a user may transparently transition from messaging using a client on one device, to a client on another device. The transparency includes that the user will continue to view messaging communications they are currently engaged in, including the history of the communication, irrespective of the client(s)/device(s) the communication has spanned. The users' messaging partners also do not notice an interruption in service for the user as a transition to another device occurs. The users' messaging partners may be made aware of the transition in device types, for example, where the capabilities change (video/audio chat, file transfer capabilities, etc). Further, a user may carry on communications through accidental and intentional disconnection of clients, e.g., a transition from cellular data to wide area network (WiFi) will not cause an interruption. For example, disconnecting or putting a laptop in sleep mode prior to picking up a cell phone and opening the messaging client shouldn't result in an interruption. Events/transitions to devices can be reflected in a users' status, but do not result in lost messages/communications. Also, a user may be able to see, across multiple devices, which messages in the communication they have viewed and which they have not.

Thereby, referring to FIG. 2, the method 100 of an embodiment of the present invention discloses a method for managing a messaging state across multiple clients and devices which use respective communications systems. Step 104 includes connecting a plurality of users to multiple messaging communications systems using a plurality of associated messaging clients on respective devices for messaging communications between the users, using a proxy service. The proxy service may include a program, the program is executable by a processor of a computer.

Step 106 includes managing the messaging communications between user 60 which includes having the proxy service 20 schematically between the user/device 80 and the messaging service 50. Step 108 includes maintaining the messaging communications of the users by storing the users' messaging communications from the multiple messaging communications systems and their respective messaging clients. The above step may be completed using the proxy service, and the messaging communications may be stored in one or more databases. Step 112 includes determining and tracking a currently used device used by a messaging user. Step 116 includes routing a current messaging communication of the messaging user from the stored messaging communications to the currently used device via a respective messaging communications system, using the proxy service.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for maintaining a messaging state across multiple clients and devices which use respective communications systems, comprising:
    connecting a plurality of users to multiple messaging communications systems, the multiple messaging communications systems using a plurality of associated messaging clients on each of the users' respective devices, for messaging communications between the users;
    storing the users' messaging communications from the multiple messaging communications systems and their respective messaging clients, using a proxy service, to create a messaging communication history including all the messaging communications for the user, each of the messaging communications being stored with a respective creation date;
    tracking a device using the proxy service, of the plurality of messaging clients, in response to the device being used by a messaging user of the plurality of users;
    detecting a currently used device, in response to the messaging user switching the device;
    retrieving a current messaging communication including the messaging communication history using the proxy service; and
    routing the current messaging communication of the messaging user including the messaging communication history from the stored messaging communications to the currently used device, using the proxy service, the messaging communication history including all the messaging communications sorted by their respective creation date, for maintaining a state of the messaging communications of the users wherein the messaging user receives the current messaging communication seamlessly after the switching of the device.

2. The method of claim 1, wherein the stored users' messaging communications are accessible both for context and for data mining to other services.

3. The method of claim 1, wherein the messaging clients include: instant messaging, or short messaging service.

4. The method of claim 1, wherein the detecting a currently used device in response to the messaging user switching the device includes switching to a messaging client of a plurality of messaging clients respective to the currently used device.

5. The method of claim 1, wherein the users in a messaging communication are notified of a currently used device for a user who switch between devices.

6. The method of claim 1, further comprising:
assigning a message identification to the user's messaging communication including a timestamp;
generating a device identification for each of the users' devices; and
retrieving the stored messaging communications from a database using the message identification and the device identification.

7. A computer system for managing a messaging state across multiple clients and devices which use respective communications systems, which comprises:
multiple messaging communications systems using a plurality of associated messaging clients on respective devices for messaging communications between a plurality of users; and
a proxy service including one or more computer processors, one or more computer-readable storage media, and program instructions stored on one or more of the computer-readable storage media for execution by at least one of the one or more processors, using the program instructions the proxy service being configured to:
store the users' messaging communications from the multiple messaging communications systems and their respective messaging clients to create a messaging communication history including all the messaging communications for the user, each of the messaging communications being stored with a respective creation date;
track a currently used device of the plurality of messaging clients, in response to the device being used by a messaging user of the plurality of users;
detect a currently used device, in response to the messaging user switching the device;
retrieve a current messaging communication including the messaging communication history; and
route the current messaging communication of the messaging user including the messaging communication history from the stored messaging communications to the currently used device via a respective messaging communications system to the currently used device, using the proxy service, the messaging communication history including all the messaging communications sorted by their respective creation date, for maintaining a state of the messaging communications of the users wherein the messaging user receives the current messaging communication seamlessly after the switching of the device.

8. The system of claim 7, further comprising:
a database configured to collect the stored users' messaging communications, and the database being accessible both for context and for data mining to other services.

9. The system of claim 7, wherein the messaging communications systems include: instant messaging, or short messaging service.

10. The system of claim 7, wherein the messaging communication systems include: an Internet, an intranet, or a public switched telephone network (PSTN).

11. The system of claim 7, wherein the proxy service includes at least one proxy server.

12. The system of claim 7, wherein the detect a currently used device in response to the messaging user switching the device includes switching to a messaging client of a plurality of messaging clients respective to the currently used device.

13. The system of claim 7, wherein the users in a messaging communication are notified of a currently used device for a user who switch between devices.

14. A computer program product for maintaining a messaging state across multiple clients and devices which use respective communications systems, the computer program product comprising a computer readable storage medium having program code embodied therewith, the program code being readable/executable by a processor to perform a method comprising:
connecting a plurality of users to multiple messaging communications systems using a plurality of associated messaging clients on respective devices of the users for messaging communications between the users, using a proxy service;
storing the users' messaging communications from the multiple messaging communications systems and their respective messaging clients, using the proxy service, to create a messaging communication history including all the messaging communications for the user, each of the messaging communications being stored with a respective creation date;
tracking a currently used device of the plurality of messaging clients used by a messaging user of the plurality of users;
detecting the currently used device, in response to the messaging user switching the device;
retrieving a current messaging communication including the messaging communication history using the proxy service; and
routing the current messaging communication of the messaging user including the messaging communication history from the stored messaging communications to the currently used device via a respective messaging communications system, using the proxy service, the messaging communication history including all the messaging communications sorted by their respective creation date, for maintaining a state of the messaging communications of the users wherein the messaging user receives the current messaging communication seamlessly after the switching of the device.

15. The computer program product of claim 14, wherein the stored users' messaging communications are accessible both for context and for data mining to other services.

16. The computer program product of claim 14, wherein the detecting a currently used device in response to the messaging user switching the device includes switching to a messaging client of a plurality of messaging clients respective to the currently used device.

17. The computer program product of claim 14, wherein the users in a messaging communication are notified of a currently used device for a user who switch between devices.

18. The computer program product of claim 14, wherein the messaging clients include: instant messaging, or short messaging service.

19. The method of claim 1, wherein the proxy service detects the messaging user switching the device to the currently used device and routes the current messaging communication to a corresponding messaging system for delivery to the currently used device.

20. The method of claim 1, wherein:
in response to the detecting the currently used device, the currently used device requests the current messaging communication; and
the proxy service responds by routing the current messaging communication of the messaging user including the messaging communication history form the stored messaging communications to the currently used device.

* * * * *